Nov. 15, 1938.  H. L. BERNARD  2,136,836
REAR VIEW MIRROR
Filed Aug. 28, 1937

Inventor
H. L. Bernard
By Watson E. Coleman
Attorney

UNITED STATES PATENT OFFICE 2,136,836

REAR VIEW MIRROR

Harley L. Bernard, Quincy, Mo.

Application August 28, 1937, Serial No. 161,517

1 Claim. (Cl. 248—298)

This invention relates to motor vehicles and more particularly to a device adapted to be attached to a motor vehicle to enable the driver of the vehicle to see rearwardly of one side of the vehicle.

An object of this invention is to provide a rear view mirror which may be mounted on a vehicle, the device being particularly adapted for use in connection with motor trucks or the like so that the operator of the vehicle may see rearwardly of the vehicle particularly when backing or parking the vehicle.

It is, of course, well-known that motor trucks or the like have bodies which are considerably wider than the cab or driver compartment and that in order to provide a means whereby the driver can look rearwardly it is necessary to provide a relatively long supporting arm for a rear view mirror. At the present time, such relatively long supporting arms are provided for rear view mirrors but these arms are fixed to a side of the cab and are subjected to damage in view of their projecting nature. It is therefore an object of this invention to provide a rear view mirror which is shiftable from an inner collapsible or inoperative position to an extended or operative position, the extension of the mirror being to a degree determined by the driver in order to enable the driver to see rearwardly as when backing or the like.

Another object of this invention is to provide a device of this kind which is relatively simple in construction and which may therefore be relatively cheaply manufactured and sold and which may be mounted on any conventional motor vehicle so as to project laterally thereof to the desired degree.

With the foregoing and other objects in view, the invention will be more fully described hereinafter, and will be more particularly pointed out in the claim appended thereto.

In the drawing, wherein like symbols refer to like or corresponding parts throughout the several views.

Figure 1:
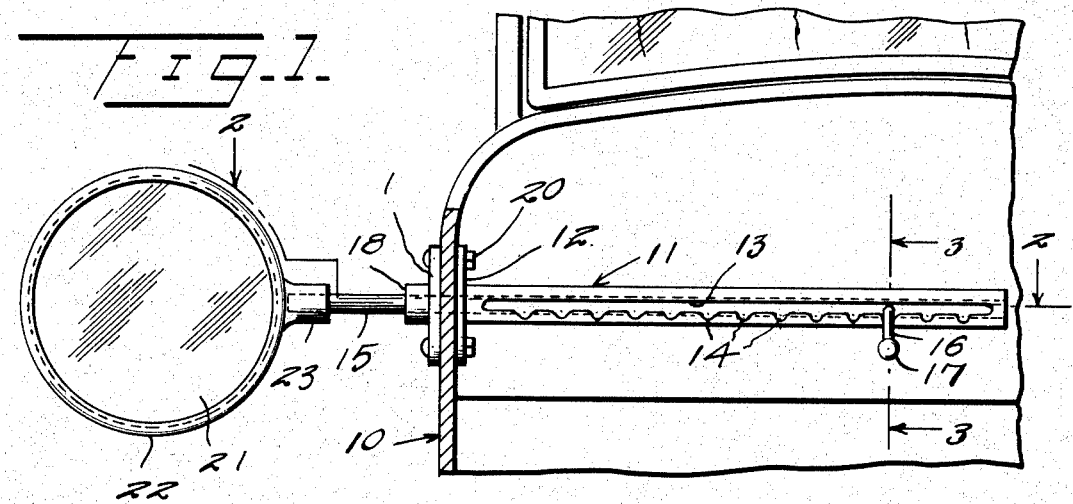
Figure 1 is a detailed rear elevation of a device constructed according to an embodiment of this invention, showing the device mounted in a motor vehicle, the vehicle being fragmentarily shown and partly in vertical section.
Figure 2:
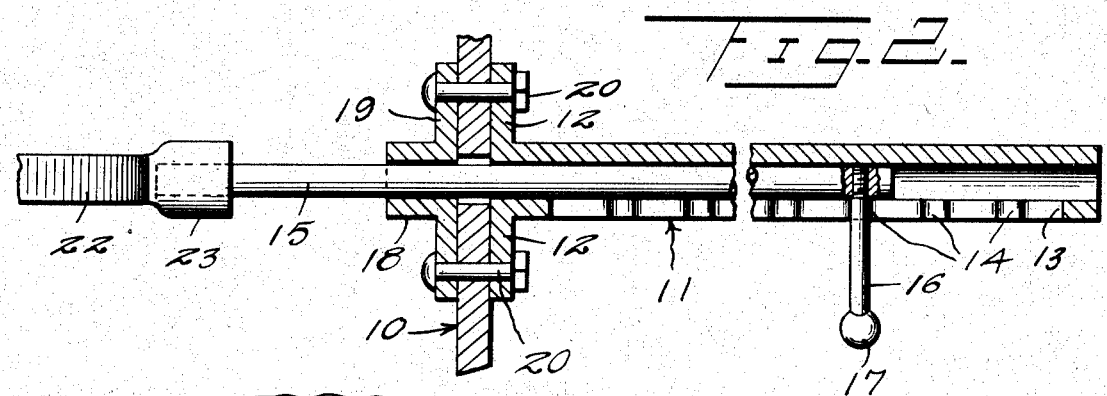
Figure 2 is an enlarged fragmentary sectional view taken on the line 2—2 of Figure 1.
Figure 3:
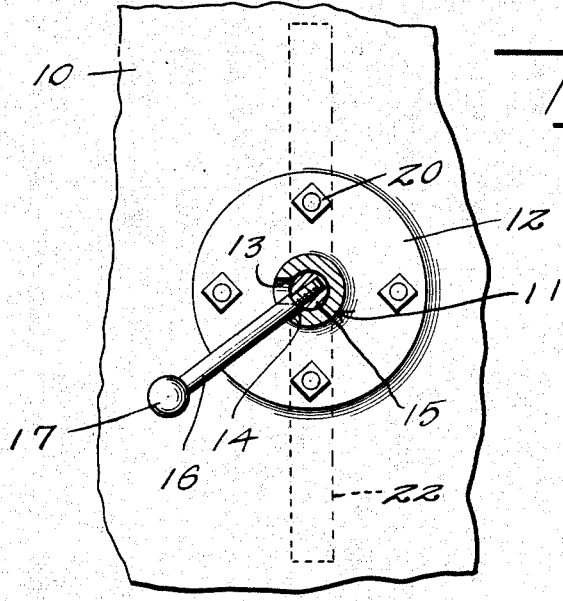
Figure 3 is a sectional view taken on the line 3—3 of Figure 1.

Referring to the drawing, the numeral 10 designates generally the side wall of a motor vehicle adjacent the forward end of the driver's compartment. A tubular housing 11 which is provided with an outer flange 12 is disposed within the cab or driver's compartment of the vehicle and the flange 12 is adapted to engage against the inner side of the wall 10 of the vehicle. The housing 11 is provided with an elongated slot 13 and a plurality of notches 14 are provided in one side of the slot 13. A supporting rod 15 is slidable in the housing 11 and the inner end of the rod 15 is provided with an operating lever 16 which is threadably secured to the rod 15 and provided with knob 17.

The lever 16 projects through the slot 13 and is adapted to seat in a selected notch 14 so as to hold the rod 15 in a predetermined selected position relative to the housing 11. A bushing 18 is disposed about the rod 15 on the outer side of the vehicle wall 10 and is provided with a flange 19 engaging against the wall 10. Bolts or suitable fastening devices 20 engage through the flange 19 and the flange 12 and thus support the housing 11 in a substantially horizontal position. A mirror 21 mounted in an angular frame 22 which has a bushing or boss 23 secured to the outer end of the supporting rod 15.

In the use of this device, the mirror 21 may be normally disposed in an inner or collapsed position with the lever 16 engaging in the innermost notch 14. When it is desired to extend the mirror 21 to an operative or extended position, the lever 16 is raised and then moved outwardly along the slot 13 so as to move the supporting rod 15 outwardly to a position where the mirror 21 will be disposed beyond the adjacent side wall of the truck or vehicle body.

It will be apparent from the foregoing that while in an operative position the mirror 21 will project beyond the side of the vehicle body, the mirror 21 may be quickly and easily returned to an inoperative or collapsed position closely adjacent the side wall 10 of the vehicle. This device embodies the use of relatively few parts which will not get out of order easily and which are so constructed that they may be mounted on any conventional vehicle body in any suitable position convenient to the driver of the vehicle.

It is, of course, understood that various changes and modifications may be made in the details or construction and design of the above specifically described embodiment of this invention without departing from the spirit thereof, such changes and modifications being restricted only by the scope of the following claim.

I claim:

A rear vision mirror supporting structure, comprising a tubular housing formed with an elongated slot in one wall in which are a plurality of notches, said housing being formed at one end with a flange, a tubular flanged bushing adapted to register with the bore of said housing, bolts passing thru the flanges of the bushing and the housing and adapted to fasten the bushing and housing to the side wall of a motor vehicle on opposite faces thereof, a mirror supporting rod passing thru said bushing and into the housing for rotative and longitudinal movement therein, and an operating lever receivable in said slot and adapted to rest in a selected notch thereof, said operating lever being threadably engaged at one end with the inner end of said rod.

HARLEY L. BERNARD.